United States Patent
Wang et al.

(10) Patent No.: US 7,843,151 B2
(45) Date of Patent: Nov. 30, 2010

(54) BACKLIGHT CONTROL CIRCUIT WITH MICRO CONTROLLER FEEDING OPERATING STATE OF LOAD CIRCUIT BACK TO PULSE WIDTH MODULATION INTEGRATED CIRCUIT

(75) Inventors: Hong-Ren Wang, Shenzhen (CN); Yi-Hsiang Kao, Miao-Li (TW)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 291 days.

(21) Appl. No.: 12/011,696

(22) Filed: Jan. 28, 2008

(65) Prior Publication Data

US 2008/0180038 A1    Jul. 31, 2008

(30) Foreign Application Priority Data

Jan. 26, 2007    (CN) .................... 2007 1 0073128

(51) Int. Cl.
*H05B 37/02* (2006.01)
(52) U.S. Cl. .................... 315/308; 315/246; 315/312
(58) Field of Classification Search ............ 315/209 R, 315/224, 246, 250, 268, 291, 307–308, 312, 315/262; 345/102; 361/93.1, 93.7, 93.9
See application file for complete search history.

(56) References Cited

U.S. PATENT DOCUMENTS

| | | | | |
|---|---|---|---|---|
| 5,339,009 A * | 8/1994 | Lai | ............................ | 315/291 |
| 5,923,129 A * | 7/1999 | Henry | ........................ | 315/307 |
| 6,376,999 B1 * | 4/2002 | Li et al. | ....................... | 315/307 |
| 6,504,321 B2 * | 1/2003 | Giannopoulos et al. | ...... | 315/291 |
| 6,657,838 B2 | 12/2003 | Min | | |
| 6,674,379 B1 * | 1/2004 | Li et al. | ....................... | 341/123 |
| 2006/0049780 A1 | 3/2006 | Hsieh | | |
| 2007/0126375 A1 * | 6/2007 | Liu et al. | ..................... | 315/307 |
| 2007/0188114 A1 * | 8/2007 | Lys et al. | ..................... | 315/308 |
| 2008/0272277 A1 * | 11/2008 | Wei | ............................ | 250/205 |

FOREIGN PATENT DOCUMENTS

CN        1881038 A      12/2006

* cited by examiner

*Primary Examiner*—Douglas W Owens
*Assistant Examiner*—Tung X Le
(74) *Attorney, Agent, or Firm*—Wei Te Chung

(57) ABSTRACT

An exemplary backlight control circuit (200) includes at least one load circuit (210), a pulse width modulation integrated circuit (250), and a micro controller (260). The micro controller includes an output terminal and a plurality of analog to digital input terminals. The output terminal outputs a high level signal when the analog to digital input terminals all receive high level signals, and the output terminal outputs a low level signal when any one of the analog to digital input terminals receives a low level signal. The micro controller feeds operating states of the at least one load circuit back to the pulse width modulation integrated circuit.

10 Claims, 2 Drawing Sheets

BACKLIGHT CONTROL CIRCUIT WITH MICRO CONTROLLER FEEDING OPERATING STATE OF LOAD CIRCUIT BACK TO PULSE WIDTH MODULATION INTEGRATED CIRCUIT

FIELD OF THE INVENTION

The present invention relates to backlight control circuits, and particularly to a backlight control circuit with a micro controller for feeding operating states of load circuits back to a pulse width modulation integrated circuit thereof.

GENERAL BACKGROUND

A liquid crystal display (LCD) has advantages of portability, low power consumption, and low radiation. LCDs have been widely used in various portable information products, such as notebooks, personal digital assistants (PDAs), video cameras, and the like. Furthermore, LCDs are considered by many to have the potential to completely replace CRT (cathode ray tube) monitors and televisions.

A typical LCD includes an LCD panel, a backlight for illuminating the LCD panel, an inverter circuit for driving the backlight, and a backlight control circuit. The backlight control circuit generally includes a pulse width modulation integrated circuit (PWM IC) for driving the inverter circuit, and a backlight protection circuit for shutting down the PWM IC when any lamp of the backlight has an open circuit or a short circuit.

FIG. 2 is a circuit diagram of a typical backlight control circuit. The backlight control circuit 100 includes four load circuits 110, a PWM IC 150, and a backlight protection circuit (not labeled). The backlight protection circuit includes an input circuit 130 and a switch circuit 170.

Each load circuit 110 includes a lamp 111 and a lamp inspecting circuit 113 connected in series between a power supply (not shown) and ground. The lamp inspecting circuit 113 includes an output terminal 112. The output terminal 112 provides a high voltage when the corresponding lamp 111 works, and provides a low voltage when the corresponding lamp 111 has an open circuit or a short circuit.

The PWM IC 150 includes a current sampling pin 151. The PWM IC 150 stops working if the current sampling pin 151 has a low voltage.

The switch circuit 170 includes a first transistor 1331, a first current limiting resistor 172, a second current limiting resistor 173, and an output terminal 175. A source electrode of the first transistor 1331 is grounded, and the drain electrode of the first transistor 1331 is connected to the current sampling pin 151 of the PWM IC 150. A gate electrode of the first transistor 1331 is connected to a power supply VDD via the first current limiting resistor 172, and a value of the power supply VDD is 5V (volts). The drain electrode of the first transistor 1331 is also connected to the output terminal 175 via the second current limiting resistor 173, and the output terminal 175 is connected to a high level signal source (not shown).

The input circuit 130 includes four diodes 131, four resistors 132, four capacitors 135, a second transistor 1332, a third transistor 1333, a fourth transistor 1334, and a fifth transistor 1335. A drain electrode of the second transistor 1332 is connected to the gate electrode of the first transistor 1331. A drain electrode of the third transistor 1333 is connected to a source electrode of the second transistor 1332. A drain electrode of the fourth transistor 1334 is connected to a source electrode of the third transistor 1333. A drain electrode of the fifth transistor 1335 is connected to a source electrode of the fourth transistor 1334. A source electrode of the fifth transistor 1335 is grounded. Gate electrodes of the second, third, fourth, and fifth transistors 1332, 1333, 1334, and 1335 are connected to cathodes of the four diodes 131, respectively. Anodes of the four diodes 131 are respectively connected to a corresponding output terminal 112 of the lamp inspecting circuit 113. Each of the gate electrodes of the transistors 1332, 1333, 1334, 1335 is grounded via a corresponding resistor 132 and via a corresponding capacitor 135, respectively.

The first transistor 1331, the second transistor 1332, the third transistor 1333, the fourth transistor 1334, and the fifth transistor 1335 are all negative-channel metal oxide semiconductor (NMOS) type transistors.

Operation of the backlight control circuit 100 is as follows. When all the lamps 111 work normally, each of the output terminals 112 provides a high voltage to the gate electrode of the corresponding second, third, fourth, and fifth transistors 1332, 1333, 1334, and 1335 via the corresponding diode 131. Then the second, third, fourth, and fifth transistors 1332, 1333, 1334, and 1335 are switched to an activated state, and the gate electrode of the first transistor 1331 is grounded via the activated second, third, fourth, and fifth transistors 1332, 1333, 1334, and 1335. Thus, the first transistor 1331 is turned off. Because the output terminal 175 of the switch circuit 170 is connected to the high level signal source, the current sampling pin 151 of the PWM IC 150 receives a high level signal, and the PWM IC 150 operates normally.

When any one of the lamps 111 has an open circuit or a short circuit, the corresponding output terminal 112 provides a low voltage to the gate electrode of the corresponding second, third, fourth, or fifth transistor 1332, 1333, 1334, or 1335 via the corresponding diode 131. Then the corresponding second, third, fourth, or fifth transistor 1332, 1333, 1334, or 1335 is turned off, so that the gate electrode of the first transistor 1331 is charged to a high voltage by the power supply VDD via the first current limiting resistor 172. Thus, the first transistor 1331 is switched to an activated state, and the current sampling pin 151 of the PWM IC 150 is grounded via the activated first transistor 1331. Consequently, the current sampling pin 151 of the PWM IC 150 is charged to a low voltage, and the PWM IC 150 stops working.

The backlight control circuit 100 includes five transistors 1331, 1332, 1333, 1334, and 1335 to carry out the function of protecting the lamps 111. Furthermore, the number of the transistors needs to increase along with the number of lamps 111 used in the LCD. Consequently, the cost of the backlight control circuit 100 is high, particularly in the case where the number of lamps 111 is large.

It is desired to provide a backlight control circuit used typically in an LCD which overcomes the above-described deficiencies.

SUMMARY

In one preferred embodiment, a backlight control circuit includes at least one load circuit, a pulse width modulation integrated circuit, and a micro controller. Each load circuit includes a lamp and an output terminal. The output terminal outputs a high voltage when the lamp is in a normal working state, and outputs a low voltage when the lamp is in an open circuit state or a short circuit state. The pulse width modulation integrated circuit includes a current sampling pin, the pulse width modulation integrated circuit stops working if the current sampling pin has a low voltage. The micro controller includes an output terminal and a plurality of analog to digital input terminals. The output terminal outputs a high level signal when the analog to digital input terminals all receive high level signals, and the output terminal outputs a low level signal when any one of the analog to digital input terminals receives a low level signal. The output terminal of each load circuit is connected to a corresponding analog to digital input terminal of the micro controller, the output terminal of the micro controller is connected to the current sampling pin of the pulse width modulation integrated circuit.

In another preferred embodiment, a backlight control circuit includes at least one load circuit, a pulse width modulation integrated circuit, and a micro controller. The micro controller includes an output terminal and a plurality of analog to digital input terminals. The output terminal outputs a high level signal when the analog to digital input terminals all receive high level signals, and the output terminal outputs a low level signal when any one of the analog to digital input terminals receives a low level signal. The micro controller feeds operating states of the at least one load circuit back to the pulse width modulation integrated circuit.

Other novel features and advantages of the above-described backlight control circuit will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
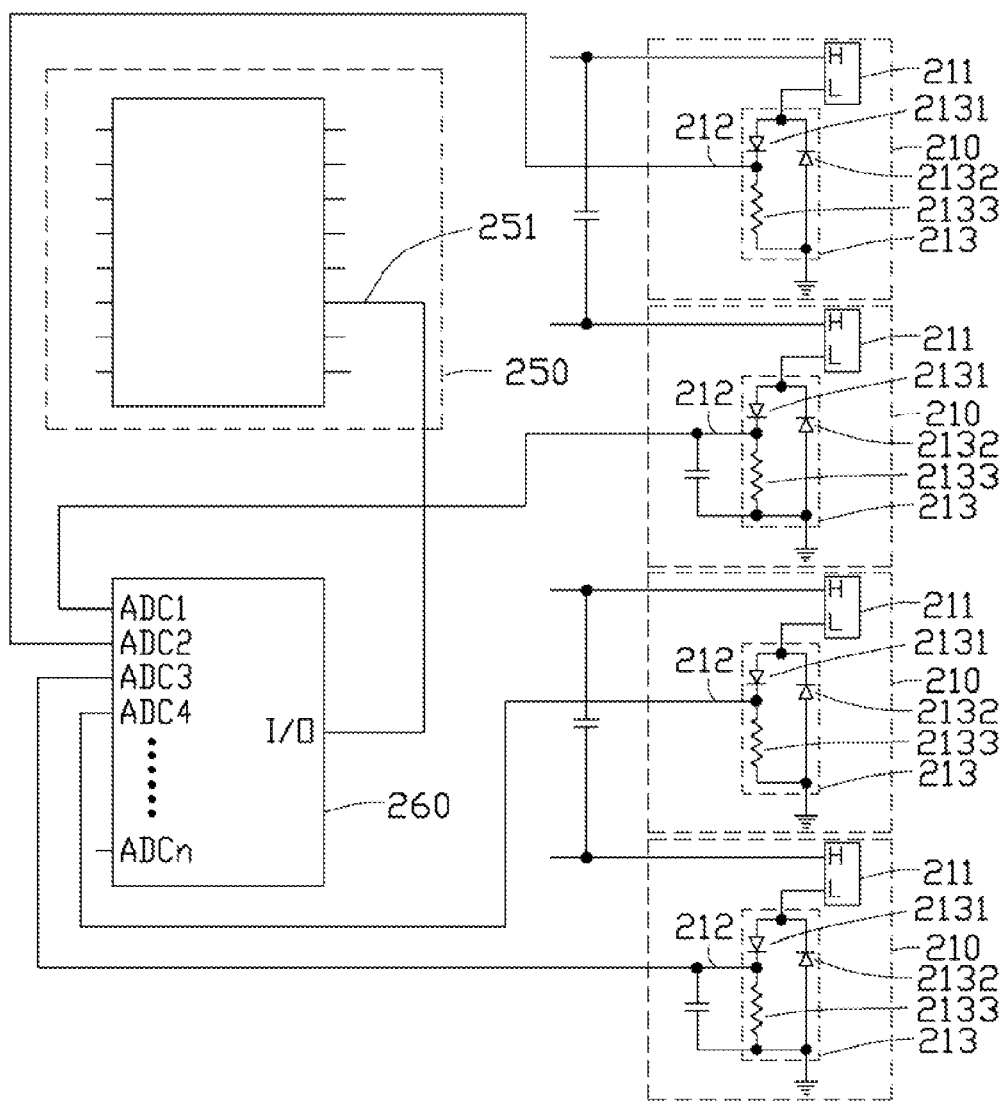
FIG. 1 is a circuit diagram of a backlight control circuit of the present invention.
Figure 2:
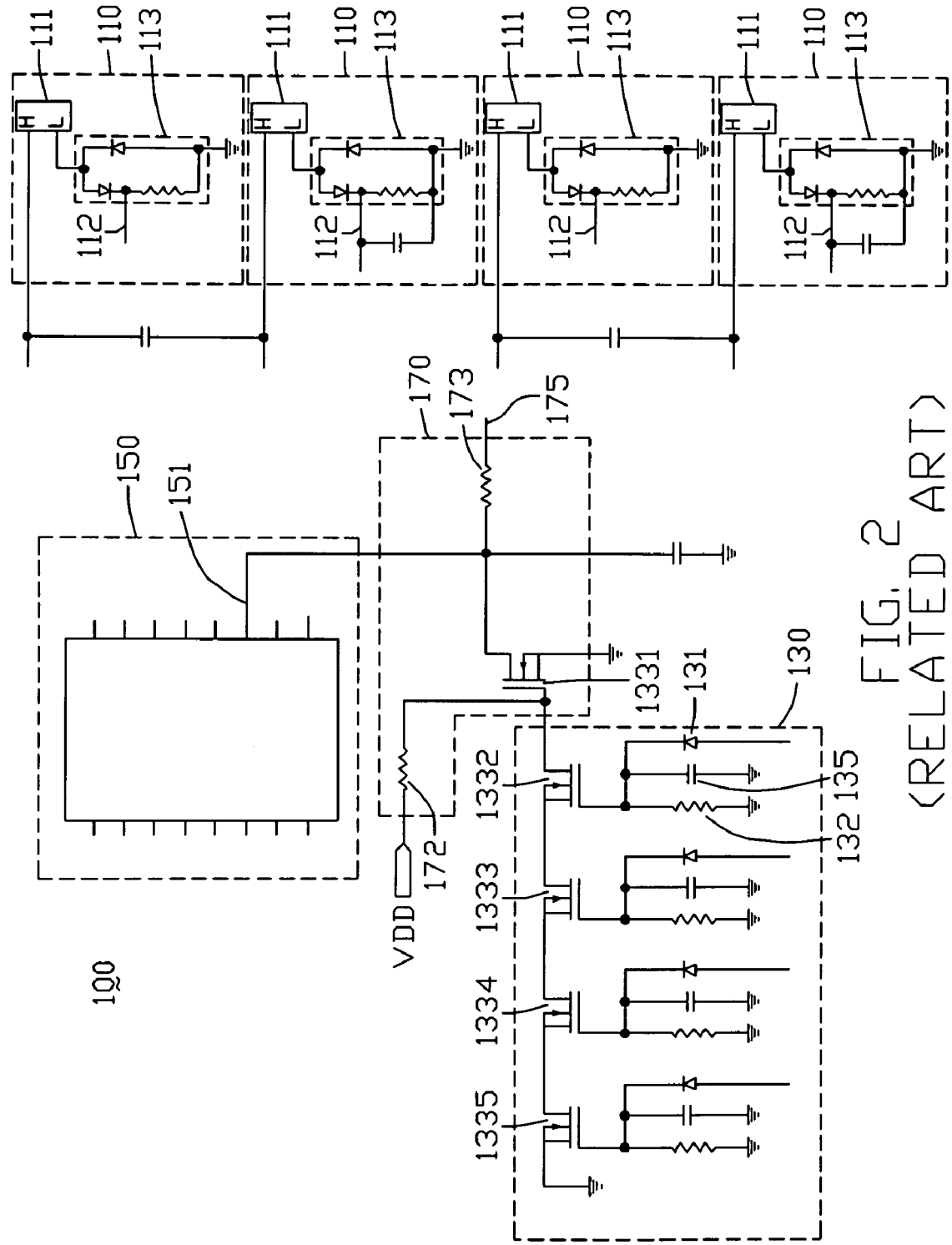
FIG. 2 is a circuit diagram of a typical backlight control circuit.

FIG. 1 is a circuit diagram of a backlight control circuit of the present invention. The backlight control circuit 200 includes four load circuits 210, a PWM IC 250, and a micro controller 260.

Each load circuit 210 includes a lamp 211, an output terminal 212, and a lamp inspecting circuit 213. A high voltage terminal of the lamp 211 is connected to an alternate current power supply (not shown). The lamp inspecting circuit 213 includes a first diode 2131, a second diode 2132, and a resistor 2133. An anode of the first diode 2131 is connected to a low voltage terminal of the lamp 211, and a cathode of the first diode 2131 is connected to ground via the resistor 2133. A cathode of the second diode 2132 is connected to the low voltage terminal of the lamp 211, and an anode of the second diode 2132 is connected to ground. The output terminal 212 is connected to the cathode of the first diode 2131. The output terminal 212 provides a high voltage when the corresponding lamp 211 works, and provides a low voltage when the corresponding lamp 211 has an open circuit or a short circuit.

The PWM IC 250 includes a current sampling pin 251. The PWM IC 250 stops working if the current sampling pin 251 has a low voltage.

The micro controller 260 includes an output terminal I/O and a plurality of analog to digital input terminals ADC1, ADC2, ADC3, ADC4, . . . ADCn. When the analog to digital input terminals ADC1 to ADCn all receive high level signals, the output terminal I/O outputs a high level signal. When any one of the analog to digital input terminals ADC 1 to ADCn receives a low level signal, the output terminal I/O outputs a low level signal. The output terminal I/O is connected to the current sampling 251. Each of the analog to digital input terminals ADC1 to ADC4 is connected to one of the four output terminals 212 of the four load circuits 210, respectively.

Operation of the backlight control circuit 200 is as follows. When all the lamps 211 work normally, each of the output terminals 212 provides a high voltage to corresponding analog to digital input terminal ADC1, ADC2, ADC3, or ADC4. That is, the four analog to digital input terminals ADC1 to ADC4 all receive high level signals. The output terminal I/O outputs a high level signal to the current sampling 251, and the PWM IC 250 operates normally.

When any one of the lamps 211 has an open circuit or a short circuit, the corresponding output terminal 212 provides a low voltage to corresponding analog to digital input terminal ADC1, ADC2, ADC3, or ADC4. The output terminal I/O correspondingly outputs a low level signal to the current sampling 251, and the PWM IC 250 stops working.

The backlight control circuit 200 is applicable in the case that the number of the load circuits 210 is less than four. The micro controller 260 has plenty of analog to digital input terminals, when the number of the load circuits 210 is larger than four, output terminals 212 of additional load circuits 210 are connected to idle analog to digital input terminals of the micro controller 260. That is, the backlight control circuit 200 is applicable in the case that the number of the load circuits 210 is larger than four.

Compared with the backlight control circuit 100 of FIG. 1, the backlight control circuit 200 uses the micro controller 260 to replace the input circuit 130 and the switch circuit 170 to realize the function of protecting lamps. Thus, the backlight control circuit 200 has a simple circuit structure.

The micro controller 260 has plenty of analog to digital input terminals, thereby the backlight control circuit 200 needs no extra electronic elements such as transistors when the number of the lamps 211 increases, as is the case with the conventional backlight control circuit 100. Consequently, the cost of the backlight control circuit 200 does not increase when the number of the lamps 211 increases.

Furthermore, because some electronic products, for example LCD devices, have micro controllers, the micro controller 260 of the backlight control circuit 200 can be replaced by the micro controller of the electronic product when the backlight control circuit 200 is applied in the electronic product. Thus, a cost of the whole electronic product is reduced.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A backlight control circuit, comprising:
at least one load circuit, each comprising a lamp and an output terminal, the output terminal outputting a high voltage when the lamp being in a normal working state, and outputting a low voltage when the lamp being in an open circuit state or a short circuit state;
a pulse width modulation integrated circuit comprising a current sampling pin, the pulse width modulation integrated circuit configured to stop working if the current sampling pin having a low voltage;

a micro controller comprising an output terminal and a plurality of analog to digital input terminals, the output terminal outputting a high level signal when the analog to digital input terminals all receiving high level signals, and the output terminal outputting a low level signal when any one of the analog to digital input terminals receiving a low level signal;

wherein the output terminal of each load circuit is connected to a corresponding analog to digital input terminal of the micro controller, the output terminal of the micro controller is connected to the current sampling pin of the pulse width modulation integrated circuit.

2. The backlight control circuit as claimed in claim 1, wherein the backlight control circuit comprises four load circuits.

3. The backlight control circuit as claimed in claim 1, wherein each load circuit further comprises a lamp inspecting circuit, the lamp inspecting circuit comprises a first diode, a second diode, and a resistor, an anode of the first diode is connected to a low voltage terminal of the lamp, a cathode of the first diode is connected to ground via the resistor, a cathode of the second diode is connected to the low voltage terminal of the lamp, an anode of the second diode is connected to ground, the output terminal is connected to the cathode of the first diode.

4. The backlight control circuit as claimed in claim 3, wherein a high voltage terminal of the lamp of each load circuit is connected to an alternate current power supply.

5. A backlight control circuit, comprising:
at least one load circuit;
a pulse width modulation integrated circuit, the pulse width modulation integrated circuit comprises comprising a current sampling pin, the pulse width modulation integrated circuit configured to stop working if the current sampling pin has a low voltage; and
a micro controller comprising an output terminal and a plurality of analog to digital input terminals, the output terminal outputting a high level signal when the analog to digital input terminals all receiving high level signals, and the output terminal outputting a low level signal when any one of the analog to digital input terminals receiving a low level signal;

wherein the micro controller feeds operating states of the at least one load circuit back to the pulse width modulation integrated circuit.

6. The backlight control circuit as claimed in claim 5, wherein each load circuit comprises a lamp and an output terminal, the output terminal outputs a high voltage when the lamp works and outputs a low voltage when the lamp has an open circuit or a short circuit.

7. The backlight control circuit as claimed in claim 6, wherein the output terminal of each load circuit is connected to one of the analog to digital input terminals of the micro controller, the output terminal of the micro controller is connected to the current sampling pin of the pulse width modulation integrated circuit.

8. The backlight control circuit as claimed in claim 7, wherein the number of the at least one load circuits is four.

9. The backlight control circuit as claimed in claim 7, wherein each load circuit further comprises a lamp inspecting circuit, the lamp inspecting circuit comprises a first diode, a second diode, and a resistor, an anode of the first diode is connected to a low voltage terminal of the lamp, a cathode of the first diode is connected to ground via the resistor, a cathode of the second diode is connected to the low voltage terminal of the lamp, an anode of the second diode is connected to ground, the output terminal is connected to the cathode of the first diode.

10. The backlight control circuit as claimed in claim 9, wherein a high voltage terminal of the lamp of each load circuit is connected to an alternate current power supply.

\* \* \* \* \*